(12) United States Patent
Kim et al.

(10) Patent No.: US 11,450,875 B2
(45) Date of Patent: Sep. 20, 2022

(54) FUEL CELL WITH CORROSION RESISTANCE

(71) Applicants: Hyundai Motor Company, Seoul (KR); Kia Motors Corporation, Seoul (KR)

(72) Inventors: Duck Whan Kim, Gyeonggi-do (KR); Gi Young Nam, Gyeonggi-do (KR); Suk Min Baeck, Gyeonggi-do (KR); Hyun Woong Ko, Seoul (KR); Ju Han Kim, Gyeonggi-do (KR); Seung Jun Yeon, Gyeonggi-do (KR); Ki Wook Ohm, Gyeonggi-do (KR); Kwi Seong Jeong, Gyeonggi-do (KR); Yong Suk Heo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 352 days.

(21) Appl. No.: 16/538,410

(22) Filed: Aug. 12, 2019

(65) Prior Publication Data
US 2020/0185749 A1 Jun. 11, 2020

(30) Foreign Application Priority Data
Dec. 5, 2018 (KR) ........................ 10-2018-0154983

(51) Int. Cl.
*H01M 8/2475* (2016.01)
*H01M 8/242* (2016.01)
(Continued)

(52) U.S. Cl.
CPC ....... *H01M 8/2475* (2013.01); *H01M 8/0202* (2013.01); *H01M 8/0271* (2013.01);
(Continued)

(58) Field of Classification Search
CPC ............. H01M 8/2475; H01M 8/2483; H01M 8/0271; H01M 8/2432; H01M 8/2484
See application file for complete search history.

(56) References Cited

U.S. PATENT DOCUMENTS

2005/0282059 A1* 12/2005 Yanagisawa ...... H01M 8/04156
429/512
2010/0248069 A1* 9/2010 Kabumoto .......... H01M 8/0276
429/465
(Continued)

FOREIGN PATENT DOCUMENTS

JP 5829565 B2 10/2015
JP 2019096509 A * 6/2019

*Primary Examiner* — Jonathan G Jelsma
(74) *Attorney, Agent, or Firm* — Fox Rothschild LLP

(57) ABSTRACT

A fuel cell is provided that includes a cell stack having a plurality of unit cells stacked in a first direction. An enclosure is disposed to surround the cell stack and includes an inlet that suctions external air and an outlet that discharges air that has been suctioned through the inlet and has circulated in the space between the cell stack and the enclosure. An insulating member is disposed to extend in the first direction in the space between an outer surface of the cell stack and an inner surface of the enclosure. The insulating member divides the space into a plurality of spaces and has an aperture formed therein to provide communication between the divided plurality of spaces, and an air intake member configured to suction air discharged from the outlet.

19 Claims, 10 Drawing Sheets

(51) Int. Cl.
*H01M 8/2483* (2016.01)
*H01M 8/2432* (2016.01)
*H01M 8/0271* (2016.01)
*H01M 8/2484* (2016.01)
*H01M 8/0202* (2016.01)

(52) U.S. Cl.
CPC ......... *H01M 8/242* (2013.01); *H01M 8/2432* (2016.02); *H01M 8/2483* (2016.02); *H01M 8/2484* (2016.02)

(56) References Cited

U.S. PATENT DOCUMENTS

2017/0250416 A1* 8/2017 Watanabe ........... H01M 8/0432
2017/0365872 A1* 12/2017 Takabatake ......... H01M 8/0232

* cited by examiner

FUEL CELL WITH CORROSION RESISTANCE

CROSS REFERENCE TO THE RELATED APPLICATION(S)

This application claims the benefit of Korean Patent Application No. 10-2018-0154983, filed on Dec. 5, 2018, which is hereby incorporated by reference as if fully set forth herein.

BACKGROUND

Field of the Invention

The present invention relates to a fuel cell and, more particularly, to a fuel cell that has improved stability and corrosion resistance.

Discussion of the Related Art

A fuel cell stack obtains electricity through a chemical reaction between hydrogen and oxygen (or air). In particular, water (hereinafter referred to as product water or condensate water) is generated during the chemical reaction process in which hydrogen and oxygen are combined. The generated water may be discharged to the outside and may be used to appropriately maintain the humidity of an electrolyte membrane to aid in the reaction. However, in this process, moisture may leak to the outside of the cell stack through the edge of the electrolyte membrane.

Thus, when the cell stack is operated, the humidity in the space between the enclosure of the cell stack and the cell stack increases due to the moisture discharged to the outside. When moisture accumulates above the saturated water vapor pressure level, condensation occurs inside the cell stack. The condensate water may create an electrical path between high-voltage parts and the chassis, thus destroying electrical insulation inside the cell stack and causing corrosion of the constituent parts. To prevent this phenomenon, various solutions have been studied, such as adopting a structure that completely surrounds the outside of the electrolyte membrane, or adopting a separate ventilation structure when it is difficult to adopt a structure surrounding the outside of the electrolyte membrane.

SUMMARY

Accordingly, the present invention provides a fuel cell that having improved electrical stability and corrosion resistance.

In one exemplary embodiment, a fuel cell may include a cell stack having a plurality of unit cells stacked in a first direction, an enclosure disposed to surround at least a part of the cell stack, the enclosure including an inlet suctioning external air and an outlet discharging air that has been suctioned through the inlet and has circulated in the space between the cell stack and the enclosure, and an insulating member disposed to extend in the first direction in the space between an outer surface of the cell stack and an inner surface of the enclosure, the insulating member dividing the space into a plurality of spaces, the insulating member having a groove formed therein to cause the divided plurality of spaces to communicate with each other.

For example, the groove may be spaced apart from the outer surface of the cell stack and may be in contact with the inner surface of the enclosure. The insulating member may include a first edge that is in contact with the outer surface of the cell stack and a second edge that is in contact with the inner surface of the enclosure, and the groove may be spaced apart from the outer surface of the cell stack and the inner surface of the enclosure and may be disposed between the first edge and the second edge of the insulating member.

Further, the groove may include a plurality of grooves disposed to be spaced apart from each other in the first direction. For example, the plurality of grooves disposed in the first direction may gradually increase from the inlet and the outlet. For example, the plurality of grooves may include a first groove and a second groove located farther from the inlet and the outlet than the first groove, and the second groove may have a larger cross-sectional area than the first groove.

The plurality of grooves may have the same size, and the distances between the plurality of grooves may gradually decrease from the inlet and the outlet. For example, the inner surface of the enclosure may include a front surface and a rear surface facing each other in a first direction, an inner top surface and an inner bottom surface facing each other in a second direction that intersects the first direction, and a first inner side surface and a second inner side surface facing each other in a third direction that intersects the first direction and the second direction.

Additionally, the fuel cell may further include a first end plate and a second end plate disposed at respective ends of the cell stack. The front surface of the enclosure may correspond to an inner surface of the first end plate, and the rear surface of the enclosure may correspond to an inner surface of the second end plate. For example, the inlet may be disposed at the front surface in a first corner between the first inner side surface and the inner bottom surface of the enclosure, and the outlet may be disposed at the rear surface in a second corner between the second inner side surface and the inner top surface of the enclosure. Alternatively, the inlet may be disposed at the front surface adjacent to the first corner between the first inner side surface and the inner bottom surface of the enclosure, and the outlet may be disposed at the rear surface adjacent to the second corner between the second inner side surface and the inner top surface of the enclosure.

The fuel cell may further include a humidity sensor disposed on at least one of a third corner between the first inner side surface and the inner top surface of the enclosure or a fourth corner between the second inner side surface and the inner bottom surface of the enclosure. Alternatively, the fuel cell may further include a humidity sensor disposed adjacent to at least one of the third corner between the first inner side surface and the inner top surface of the enclosure or the fourth corner between the second inner side surface and the inner bottom surface of the enclosure.

The outer surface of the cell stack may include an outer top surface and an outer bottom surface facing the inner top surface and the inner bottom surface of the enclosure, respectively, and a first outer side surface and a second outer side surface facing the first inner side surface and the second inner side surface of the enclosure, respectively.

The insulating member may include a first insulating member disposed between the outer top surface of the cell stack and the inner top surface of the enclosure. The first insulating member may include the aperture. The insulating member may further includes a second insulating member disposed between the outer bottom surface of the cell stack and the inner bottom surface of the enclosure. The second insulating member may include the aperture. A third insulating member may be disposed between the first outer side surface of the cell stack and the first inner side surface of the enclosure, the third insulating member having therein the aperture, and a fourth insulating member may be disposed between the second outer side surface of the cell stack and the second inner side surface of the enclosure, the fourth insulating member having therein the aperture.

In another exemplary embodiment, a fuel cell may include a cell stack having a plurality of unit cells stacked in a first direction, an enclosure disposed to surround at least a part of the cell stack, the enclosure including an inlet suctioning external air and an outlet discharging air that has been suctioned through the inlet and has circulated in the space between an outer surface of the cell stack and an inner surface of the enclosure, and an insulating member disposed to extend in the first direction between the outer surface of the cell stack and the inner surface of the enclosure, the insulating member having a aperture formed therein to allow the air to flow in a direction that intersects a direction in which the outer surface of the cell stack and the inner surface of the enclosure face each other and intersects the first direction.

Additionally, the fuel cell may further include an air intake member configured to suction the air discharged from the outlet. The fuel cell may further include a fan configured to discharge the air through the outlet.

BRIEF DESCRIPTION OF THE DRAWINGS

Arrangements and exemplary embodiments may be described in detail with reference to the following drawings in which like reference numerals refer to like elements and wherein.

DETAILED DESCRIPTION

Figure 1:
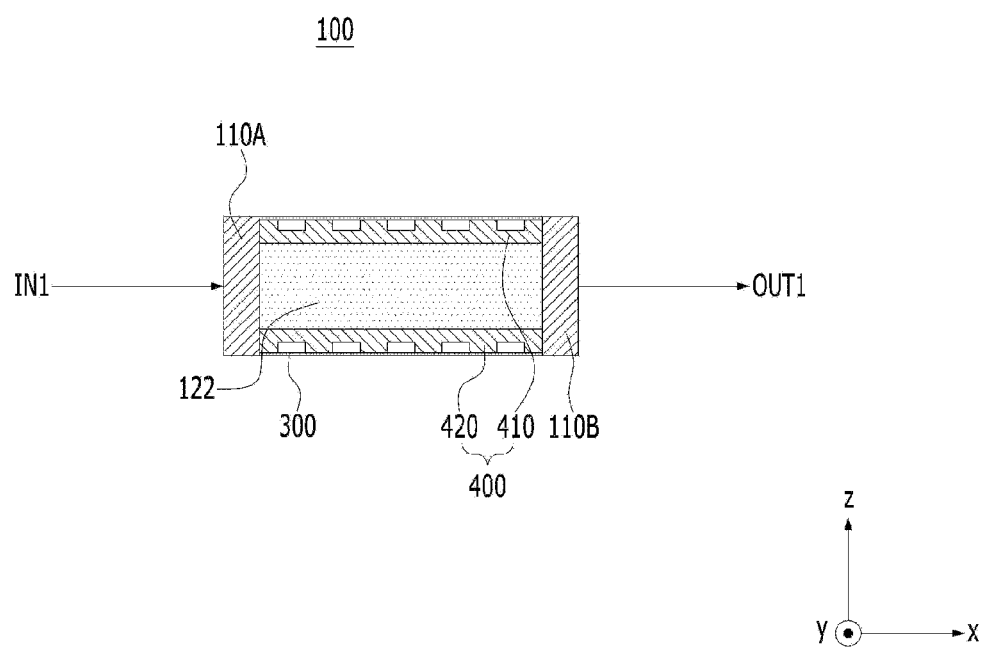
FIG. 1 is a conceptual view of a fuel cell according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will now be described more fully hereinafter with reference to the accompanying drawings, in which various exemplary embodiments are shown. The examples, however, be embodied in many different forms and should not be construed as being limited to the exemplary embodiments set forth herein. Rather, these exemplary embodiments are provided so that this invention will be more thorough and complete, and will more fully convey the scope of the invention to those skilled in the art.

It will be understood that when an element is referred to as being "on" or "under" another element, it can be directly on/under the element, or one or more intervening elements may also be present. When an element is referred to as being "on" or "under", "under the element" as well as "on the element" can be included based on the element. In addition, relational terms, such as "first", "second", "on/upper part/above" and "under/lower part/below", are used only to distinguish between one subject or element and another subject and element without necessarily requiring or involving any physical or logical relationship or sequence between such subjects or elements.

Hereinafter, a fuel cell 100 according to exemplary embodiments will be described with reference to the accompanying drawings. The fuel cell 100 will be described using a Cartesian coordinate system (x, y, z) for convenience of description. However, other different coordinate systems may be used. In the drawings, an x-axis, a y-axis, and a z-axis of the Cartesian coordinate system are perpendicular to each other. However, the embodiment is not limited thereto. That is, the x-axis, the y-axis, and the z-axis may intersect each other.

FIG. 1 is a conceptual view of a fuel cell 100 according to an exemplary embodiment. The fuel cell 100 shown in FIG. 1 may be, for example, a polymer electrolyte membrane fuel cell (or a proton exchange membrane fuel cell) (PEMFC), which has been studied extensively as a power source for driving a vehicle. However, the exemplary embodiment is not limited as to the specific form of the fuel cell. The fuel cell 100 may include end plates (or pressing plates or compression plates) 110A and 110B, a cell stack (or a stack module) 122, an enclosure 300, and an insulating member 400.

Figure 2:
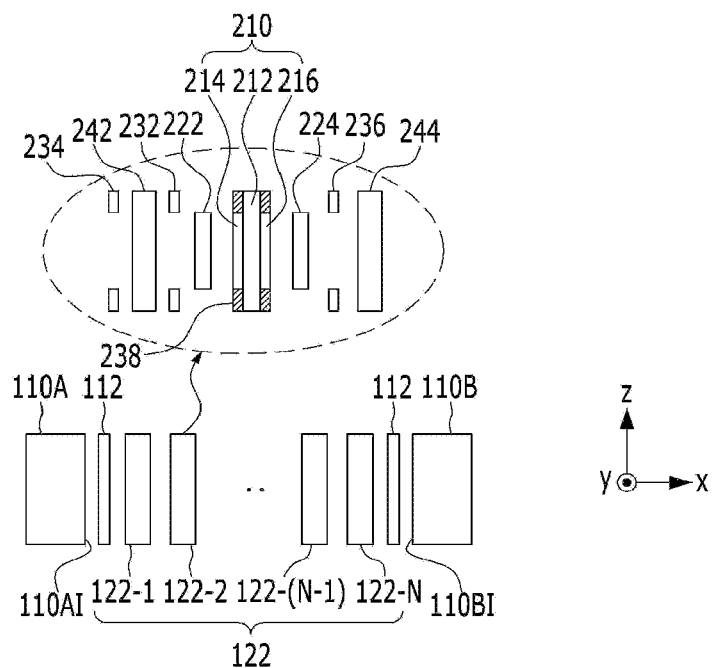
FIG. 2 is a cross-sectional view of the cell stack shown in FIG. 1 according to an exemplary embodiment of the present invention.

FIG. 2 is a cross-sectional view of the cell stack 122 shown in FIG. 1. For convenience of description, an illustration of the enclosure 300 shown in FIG. 1 is omitted in FIG. 2. The fuel cell 100 according to the exemplary embodiment may include a cell stack having a configuration different from that shown in FIG. 2, and is not limited to any specific structure of the cell stack.

The cell stack 122 may include a plurality of unit cells 122-1 to 122-N, which are stacked in a first direction (e.g. the x-axis direction). Particularly, "N" is a positive integer of 1 or greater, and may range from several tens to several hundreds. "N" may range, for example, from about 100 to 300, and preferably may be about 220. However, the embodiment is not limited to a specific value of "N".

Each unit cell 122-$n$ (where $1 \leq n \leq N$) may generate about 0.6 volts to 1.0 volts of electricity, on average about 0.7 volts of electricity. Thus, "N" may be determined based on the intensity of the power to be supplied from the fuel cell 100 to a load. In particular, the load may refer to a part of a vehicle that requires power when the fuel cell 100 is used in a vehicle. Each unit cell 122-$n$ may include a membrane electrode assembly (MEA) 210, gas diffusion layers (GDLs) 222 and 224, gaskets 232, 234 and 236, and separators (or bipolar plates) 242 and 244.

The membrane electrode assembly 210 has a structure in which catalyst electrode layers, in which electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (or a hydrogen electrode or an anode) 214, and an air electrode (an oxygen electrode or a cathode) 216. In addition, the membrane electrode assembly 210 may further include a sub-gasket 238.

The polymer electrolyte membrane 212 may be disposed between the fuel electrode 214 and the air electrode 216. Hydrogen, which is the fuel in the fuel cell 100, may be supplied to the fuel electrode 214 through the first separator 242, and air containing oxygen as an oxidizer may be supplied to the air electrode 216 through the second separator 244. The hydrogen supplied to the fuel electrode 214 may be decomposed into hydrogen ions (protons) (H+) and electrons (e-) by the catalyst. Only the hydrogen ions may be selectively transferred to the air electrode 216 through the polymer electrolyte membrane 212, and at the same time, the electrons may be transferred to the air electrode 216 through the separators 242 and 244, which are conductors.

To realize the above operation, a catalyst layer may be applied to each of the fuel electrode 214 and the air electrode 216. The movement of the electrons described above causes the electrons to flow through an external wire, thus generating current. In other words, the fuel cell 100 may generate power due to the electrochemical reaction between hydrogen, which is fuel, and oxygen contained in the air. In the air electrode 216, the hydrogen ions supplied through the polymer electrolyte membrane 212 and the electrons transferred through the separators 242 and 244 meet oxygen in the air supplied to the air electrode 216, thus causing a reaction of generating water ("condensate water" or "product water").

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode. The gas diffusion layers 222 and 224 may uniformly distribute hydrogen and oxygen, which are reaction gases, and transfer the generated electric energy. Accordingly, the gas diffusion layers 222 and 224 may be disposed on respective sides of the membrane electrode assembly 210. In other words, the first gas diffusion layer 222 may be disposed on the left side of the fuel electrode 214, and the second gas diffusion layer 224 may be disposed on the right side of the air electrode 216.

The first gas diffusion layer 222 may diffuse and uniformly distribute hydrogen supplied as a reactant gas through the first separator 242, and may be electrically conductive. The second gas diffusion layer 224 may diffuse and uniformly distribute air supplied as a reactant gas through the second separator 244, and may be electrically conductive. Each of the first and second gas diffusion layers 222 and 224 may be a microporous layer in which fine carbon fibers are combined.

The gaskets 232, 234 and 236 may maintain the airtightness and clamping pressure of the cell stack at an appropriate level with respect to the reactant gases and the coolant, to disperse the stress when the separators 242 and 244 are stacked, and to independently seal the flow paths. Accordingly, since airtightness and watertightness may be maintained by the gaskets 232, 234 and 236, the flatness of the surfaces that are adjacent to the cell stack 122 generating power may be secured, and thus surface pressure may be distributed uniformly over the reaction surface of the cell stack 122.

The separators 242 and 244 may move the reactant gases and the cooling medium and to separate each of the unit cells from the other unit cells. In addition, the separators 242 and 244 may structurally support the membrane electrode assembly 210 and the gas diffusion layers 222 and 224 and may collect the generated current and transfer the collected current to current collectors 112. The separators 242 and 244 may be disposed outside the gas diffusion layers 222 and 224, respectively. In other words, the first separator 242 may be disposed on the left side of the first gas diffusion layer 222, and the second separator 244 may be disposed on the right side of the second gas diffusion layer 224.

The first separator 242 may be configured to supply hydrogen as a reactant gas to the fuel electrode 214 through the first gas diffusion layer 222. The second separator 244 may be configured to supply air as a reactant gas to the air electrode 216 through the second gas diffusion layer 224. In addition, each of the first and second separators 242 and 244 may form a channel through which a cooling medium (e.g. coolant) may flow. Further, the separators 242 and 244 may be formed of a graphite-based material, a composite graphite-based material, or a metal-based material.

The end plates 110A and 110B shown in FIGS. 1 and 2 may be disposed at both ends of the cell stack 122, respectively, to support and fix the unit cells 122. In other words, the first end plate 110A may be disposed at one end (e.g., a first end) of the cell stack 122, and the second end plate 110B may be disposed at the opposite end (e.g., a second end) of the cell stack 122. Each of the end plates 110A and 110B may be configured such that a metal insert is surrounded by a plastic injection-molded product. The metal insert of each of the end plates 110A and 110B may have high rigidity to withstand internal surface pressure, and may be formed by machining a metal material. For example, each of the end plates 110A and 110B may be formed by combining a plurality of plates.

The current collectors 112 may be disposed between the cell stack 122 and the inner surfaces 110AI and 110BI of the end plates 110A and 110B that face the cell stack 122. The current collectors 112 may be configured to collect the electric energy generated by the flow of electrons in the cell stack 122 and to supply the electric energy to a load that uses the fuel cell 100.

Further, the first end plate 110A may include a plurality of manifolds (e.g., communicating portions). Particularly, the manifolds may include an inlet manifold and an outlet manifold. Hydrogen and oxygen, which are reactant gases necessary in the membrane electrode assembly 210, may be introduced from the outside into the cell stack 122 through the inlet manifold. Gas or liquid, in which the humidified and supplied reactant gases and the condensate water generated in the cell are combined, may be discharged to the outside of the fuel cell 100 through the outlet manifold. The cooling medium may flow from the outside into the cell stack 122 through the inlet manifold and may flow from the cell stack 122 to the outside through the outlet manifold. As described above, the manifolds allow the fluid to flow into and out of the membrane electrode assembly 210.

Referring again to FIG. 1, the enclosure 300 may be disposed to surround at least a part of the cell stack 122 disposed between the end plates 110A and 110B. According to one exemplary embodiment, the enclosure 300 may be disposed to surround all of the four surfaces of the cell stack 122 (e.g. the outer top surface, the outer bottom surface, the first outer side surface, and the second outer side surface, which will be described later).

According to another exemplary embodiment, the enclosure 300 may be disposed to surround only some of the four surfaces of the cell stack 122, and an additional member (not shown) may be disposed to surround the remaining ones of the four surfaces of the cell stack 122. For example, the enclosure 300 may be disposed to surround only three out of the four surfaces of the cell stack 122, and an additional member may be disposed to surround the remaining one of the four surfaces of the cell stack 122. According to the exemplary embodiment, the enclosure 300 may operate as a clamping member to clamp a plurality of unit cells together with the end plates 110A and 110B in the first direction. In other words, the clamping pressure of the cell stack 122 may be maintained by the end plates 110A and 110B and the enclosure 300, which have rigid structures.

Figure 3A:
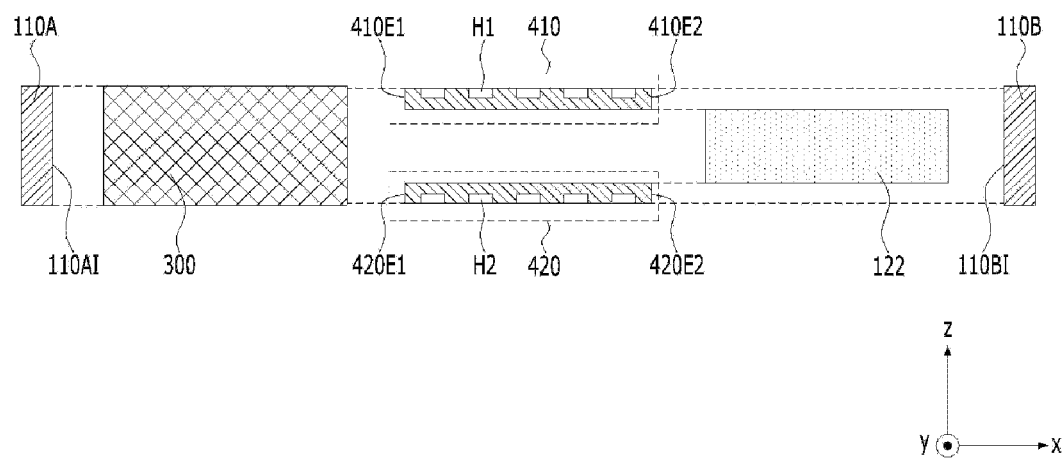
FIG. 3A is a detailed view of the fuel cell shown in FIG. 1 except for an air intake member according to an exemplary embodiment of the present invention.
Figure 3B:
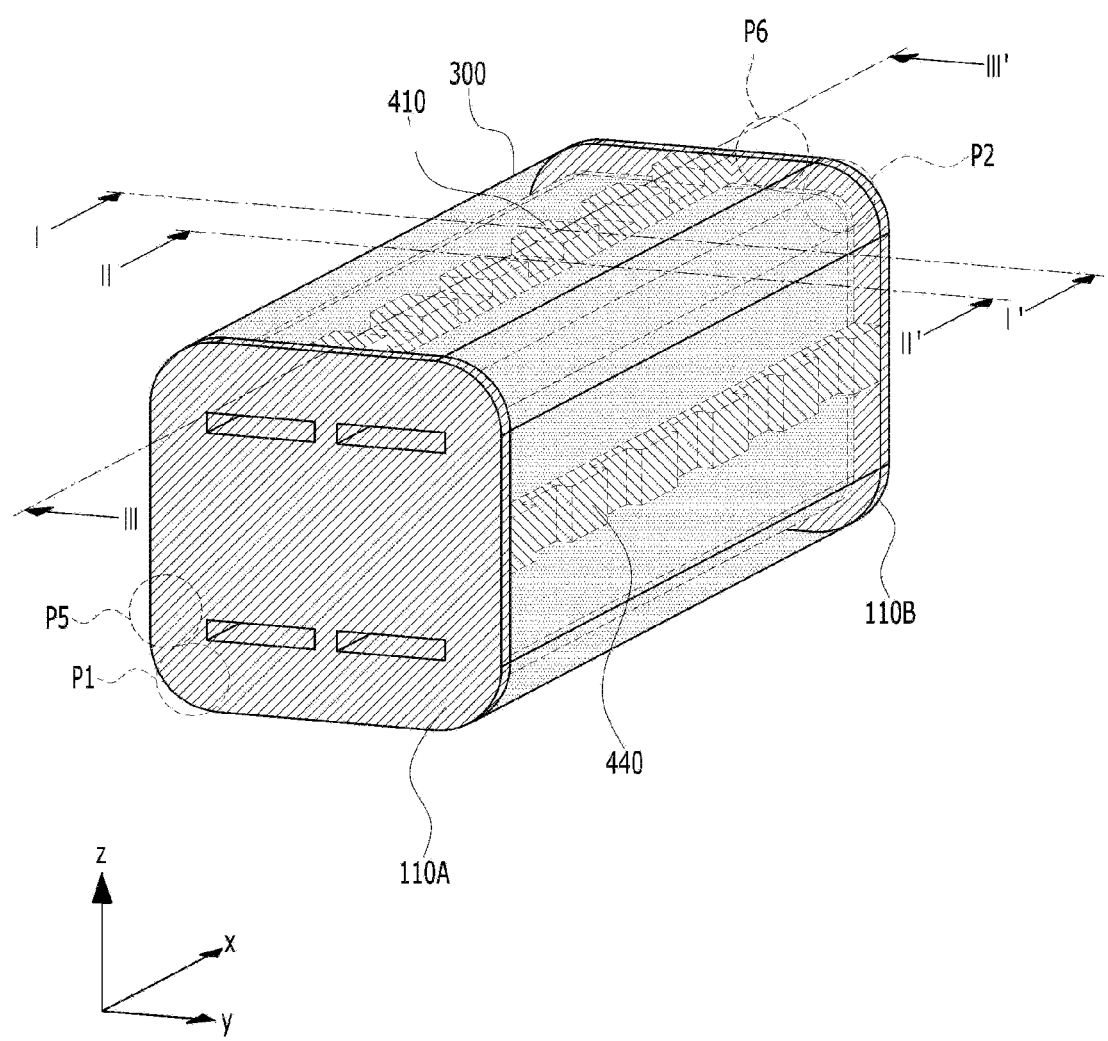
FIG. 3B is a perspective view of the fuel cell shown in FIG. 1 except for an air intake member according to an exemplary embodiment of the present invention.
Figure 3C:
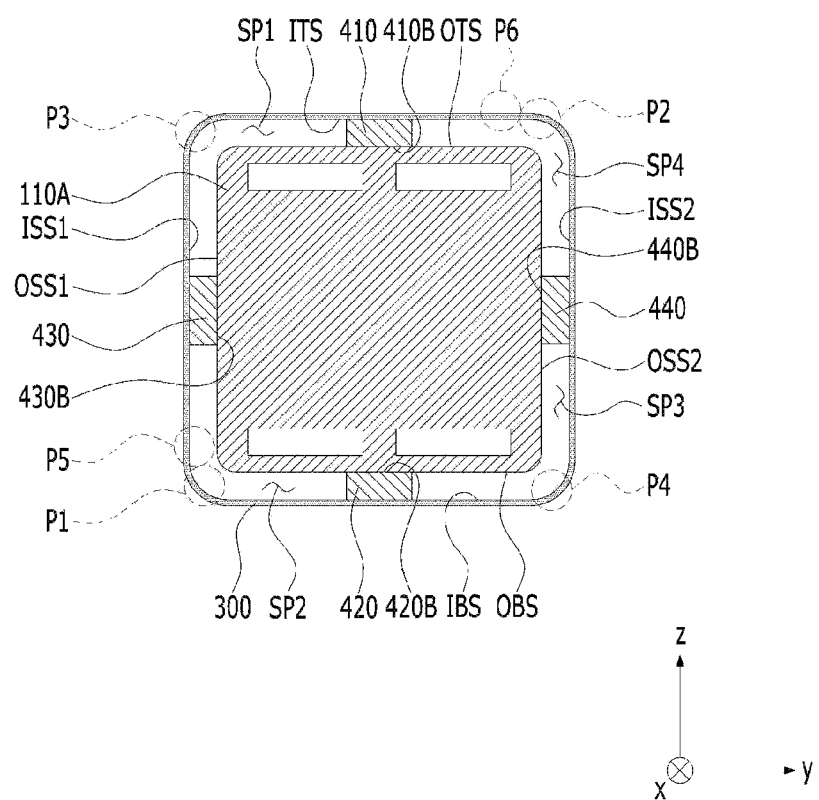
FIG. 3C is a cross-sectional view taken along line I-I' in FIG. 3B according to an exemplary embodiment of the present invention.
Figure 3D:
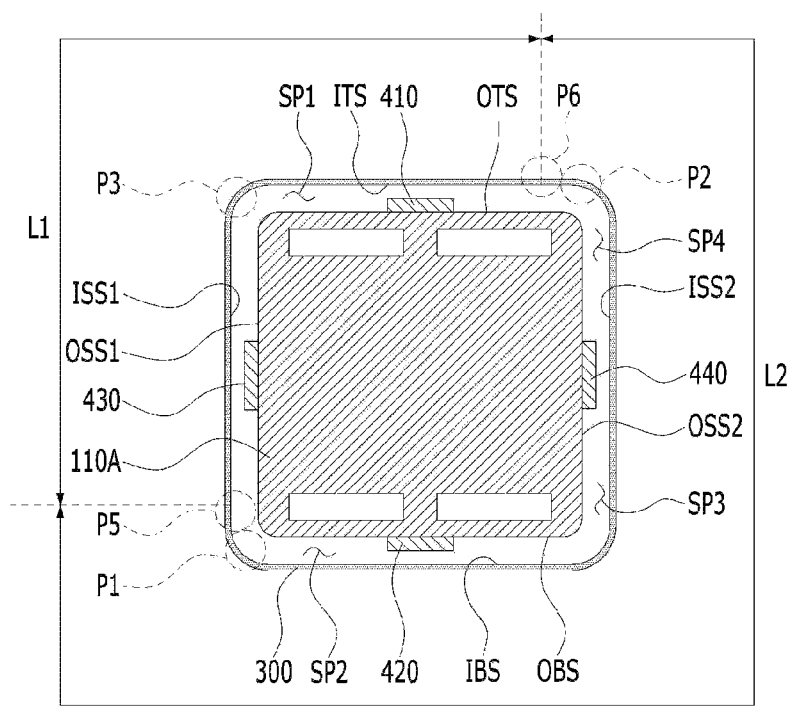
FIG. 3D is a cross-sectional view taken along line II-II' in FIG. 3B according to an exemplary embodiment of the present invention.

FIG. 3A is a detailed view of the fuel cell 100 shown in FIG. 1, FIG. 3B is a perspective view of the fuel cell 100 shown in FIG. 1, FIG. 3C is a cross-sectional view taken along line I-I' in FIG. 3B, and FIG. 3D is a cross-sectional view taken along line II-IP in FIG. 3B. The enclosure 300 according to the exemplary embodiment will be described below with reference to FIGS. 3A to 3D.

Particularly, the enclosure 300 may include an inlet (or a vent filter or a drain aperture) and an outlet (or a vent port). As shown in FIG. 1, the inlet is a component through which external air IN1 may be suctioned, and the outlet is a component through which air OUT1 that has been suctioned through the inlet and has circulated the space between the outer surface of the cell stack 122 and the inner surface of the enclosure 300 may be discharged.

Referring to FIGS. 3C and 3D, the inner surface of the enclosure 300 may include an inner top surface ITS, an inner bottom surface IBS, a first inner side surface ISS1, and a second inner side surface ISS2. The inner top surface ITS and the inner bottom surface IBS of the enclosure 300 may face each other in a second direction (e.g. the z-axis direction), which intersects the first direction (e.g. the x-axis direction). The first and second inner side surfaces ISS1 and ISS2 of the enclosure 300 may face each other in a third direction (e.g. the y-axis direction), which intersects the first direction (e.g. the x-axis direction) and the second direction (e.g. the z-axis direction).

In addition, the inner surface of the enclosure 300 may further include a front surface and a rear surface, which face each other in the first direction (e.g. the x-axis direction). According to the exemplary embodiment, the front surface of the enclosure 300 may correspond to the inner surface 110AI of the first end plate 110A, and the rear surface of the enclosure 300 may correspond to the inner surface 110BI of the second end plate 110B.

The inlet may be disposed at the front surface of the enclosure 300 in a first corner between the first inner side surface ISS1 and the inner bottom surface IBS of the enclosure 300, i.e. may be disposed at a first point P1 in the inner surface 110AI of the first end plate 110A. The outlet may be disposed at the rear surface of the enclosure 300 in a second corner between the second inner side surface ISS2 and the inner top surface ITS of the enclosure 300, i.e. may be disposed at a second point P2 in the inner surface 110BI of the second end plate 110B. Alternatively, the inlet may be disposed at a fifth point (e.g. P5) in the front surface of the enclosure 300 adjacent to the first corner P1, and the outlet may be disposed at a sixth point (e.g. P6) in the rear surface of the enclosure 300 adjacent to the second corner P2.

However, the exemplary embodiment is not limited to specific positions at which the inlet and the outlet are disposed, as long as the inlet and the outlet are spaced a greatest distance apart from each other in the enclosure 300. The outer surface of the cell stack 122 may include an outer top surface OTS, an outer bottom surface OBS, and first and second outer side surfaces OSS1 and OSS2. The outer top surface OTS of the cell stack 122 may face the inner top surface ITS of the enclosure 300, and the outer bottom surface OBS of the cell stack 122 may face the inner bottom surface IBS of the enclosure 300. The first outer side surface OSS1 of the cell stack 122 may face the first inner side surface ISS1 of the enclosure 300, and the second outer side surface OSS2 of the cell stack 122 may face the second inner side surface ISS2 of the enclosure 300.

The insulating member 400 according to the exemplary embodiment will be described below with reference to FIGS. 3A to 3D. The insulating member 400 may be disposed to extend in the first direction (e.g. the x-axis direction) between the outer surface of the cell stack 122 and the inner surface of the enclosure 300. For example, the insulating member 400, as illustrated in FIG. 3B, may be formed in a bar shape. However, the exemplary embodiment is not limited to a specific shape of the insulating member 400.

Further, the insulating member 400 may be disposed in the space between the outer surface of the cell stack 122 and the inner surface of the enclosure 300 to divide the space into a plurality of spaces. The space is specifically a gap between the outer surface of the cell stack and the inner surface of the enclosure to provide a flow path. No direct contact is present between the cell stack and the enclosure. For example, as shown in FIGS. 3B to 3D, the insulating member 400 may divide the space between the outer surface of the cell stack 122 and the inner surface of the enclosure 300 into four spaces SP1, SP2, SP3, and SP4. Accordingly, the insulating member 400 may include first to fourth insulating members 410 to 440.

The fuel cell 100 according to the exemplary embodiment may be configured as a single stack module in which cell stacks 122 are not stacked. In this fuel cell 100, the cell stack 122 may be clamped using the enclosure 300 and the insulating member 400 without using a separate clamping bar. Thus, when a vehicle equipped with the cell stack 122 including several tens to hundreds of unit cells, the insulating member 400 may prevent the cell stack 122 from being deformed or separated in the event of a low-speed collision or when the vehicle vibrates upwards, downwards, leftwards, and/or rightwards.

Particularly, the first insulating member 410 may be disposed between the outer top surface OTS of the cell stack 122 and the inner top surface ITS of the enclosure 300. The second insulating member 420 may be disposed between the outer bottom surface OBS of the cell stack 122 and the inner bottom surface IBS of the enclosure 300. The third insulating member 430 may be disposed between the first outer side surface OSS1 of the cell stack 122 and the first inner side surface ISS1 of the enclosure 300. The fourth insulating member 440 may be disposed between the second outer side surface OSS2 of the cell stack 122 and the second inner side surface ISS2 of the enclosure 300.

The insulating member 400 may include a groove (or a ventilation hole) formed therein that allows a plurality of divided spaces to communicate with each other. For example, when the insulating member 400 includes the first to fourth insulating members 410 to 440, each of the first to fourth insulating members 410 to 440 may include a groove formed therein. The groove H1 formed in the first insulating member 410 may provide communication between the first space SP1 and the fourth space SP4. The groove H2 formed in the second insulating member 420 may provide commination between the second space SP2 and the third space SP3. The groove H3 formed in the third insulating member 430 may provide communication between the first space SP1 and the second space SP2. The groove H4 formed in the fourth insulating member 440 may provide communication between the third space SP3 and the fourth space SP4.

The above-described grooves allow air to flow in the direction that intersects the direction in which the outer surface of the cell stack 122 and the inner surface of the enclosure 300 face each other and that intersects the first direction. For example, the groove H1 formed in the first insulating member 410 allows air to flow in the y-axis direction, which intersects the direction (i.e. the z-axis direction) in which the outer top surface OTS of the cell stack 122 and the inner top surface ITS of the enclosure 300 face each other and intersects the first direction (i.e. the x-axis direction).

Additionally, the groove H2 formed in the second insulating member 420 allows air to flow in the y-axis direction, which intersects the direction (i.e. the z-axis direction) in which the outer bottom surface OBS of the cell stack 122 and the inner bottom surface IBS of the enclosure 300 face each other and intersects the first direction (i.e. the x-axis direction). The groove H3 formed in the third insulating member 430 allows air to flow in the z-axis direction, which intersects the direction (i.e. the y-axis direction) in which the first outer side surface OSS1 of the cell stack 122 and the first inner side surface ISS1 of the enclosure 300 face each other and intersects the first direction (i.e. the x-axis direction). The groove H4 formed in the fourth insulating member 440 allows air to flow in the z-axis direction, which intersects the direction (i.e. the y-axis direction) in which the second outer side surface OSS2 of the cell stack 122 and the second inner side surface ISS2 of the enclosure 300 face each other and intersects the first direction (i.e. the x-axis direction).

According to one exemplary embodiment, the opposite ends of the insulating member 400 may be disposed to be in contact with (e.g., abut) the front surface and the rear surface of the enclosure 300, respectively. For example, referring to FIG. 3A, among the opposite ends 410E1 and 410E2 of the first insulating member 410, one end 410E1 thereof (e.g., a first end) may be disposed to be in contact with the inner surface 110AI of the first end plate 110A, and the opposite end 410E2 thereof (e.g., a second end) may be disposed to be in contact with the inner surface 110BI of the second end plate 110B.

Further, among the opposite ends 420E1 and 420E2 of the second insulating member 420, one end 420E1 thereof (e.g., a first end) may be disposed to be in contact with the inner surface 110AI of the first end plate 110A, and the opposite end 420E2 thereof (e.g., a second end) may be disposed to be in contact with the inner surface 110BI of the second end plate 110B. Similar to the first and second insulating members 410 and 420, the opposite ends of each of the third and fourth insulating members 430 and 440 may be disposed to be in contact with the inner surface 110AI of the first end plate 110A and the inner surface 110BI of the second end plate 110B, respectively.

Figure 4:
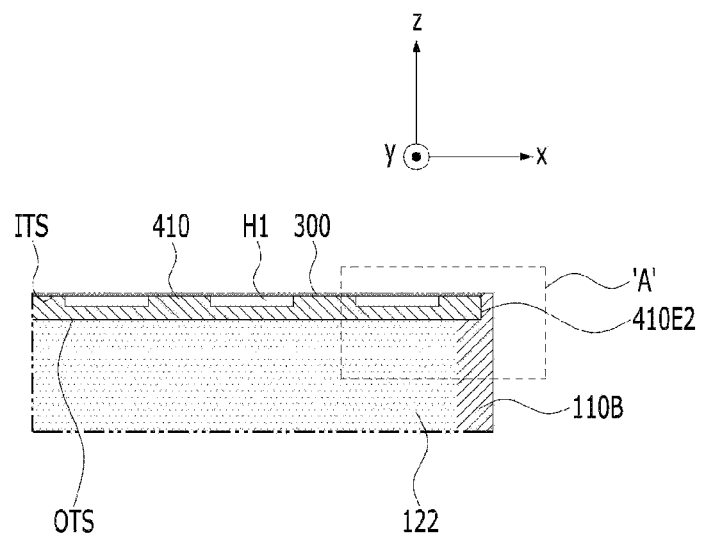
FIG. 4 is a partial cross-sectional view taken along line III-III' in FIG. 3B according to an exemplary embodiment of the present invention.

FIG. 4 is a partial cross-sectional view taken along line III-III' in FIG. 3B. According to another exemplary embodiment, among the opposite ends of the insulating member 400, one end thereof (e.g., a first end) may be disposed to be partially inserted into the first end plate 110A, and the opposite end thereof (e.g., a second end) may be disposed to be partially inserted into the second end plate 110B. For example, referring to FIG. 4, among the opposite ends 410E1 and 410E2 of the first insulating member 410, the opposite end 410E2 thereof may be disposed to be partially inserted into the second end plate 110B.

As described above, the insulating member 400 may be formed in close contact with (e.g. abutting) the first and second end plates 110A and 110B to prevent deformation of the cell stack 122 and ensure the rigidity thereof. In particular, if no groove H is formed in the insulating member 400, the spaces SP1, SP2, SP3, and SP4 between the outer surface of the cell stack 122 and the inner surface of the enclosure 300 may be blocked from each other by the insulating member 400. Thus, the air introduced from the outside through the inlet may not circulate in the spaces SP1, SP2, SP3, and SP4 that are blocked from each other. However, when the groove is formed in the insulating member 400, the spaces SP1, SP2, SP3, and SP4 may communicate with each other through the groove.

Hereinafter, various exemplary embodiments of the aperture or groove H formed in the insulating member 400 will be described below with reference to the accompanying drawings. For better understanding, a description will be made on the assumption that the inlet is disposed at the first point P1, disposed at the lower side of the first end plate 110A, and that the outlet is disposed at the second point P2, disposed at the upper side of the second end plate 110B, as shown in FIG. 3B.

Figure 5A:
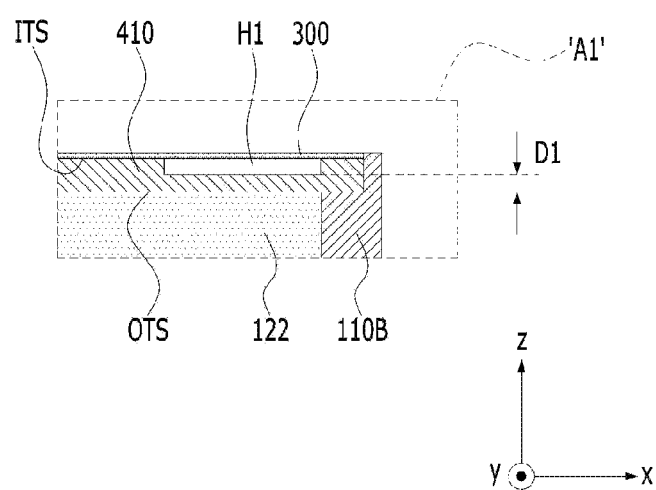
FIG. 5A is a cross-sectional view of portion 'A' shown in FIG. 4 according to an exemplary embodiment of the present invention.
Figure 5B:
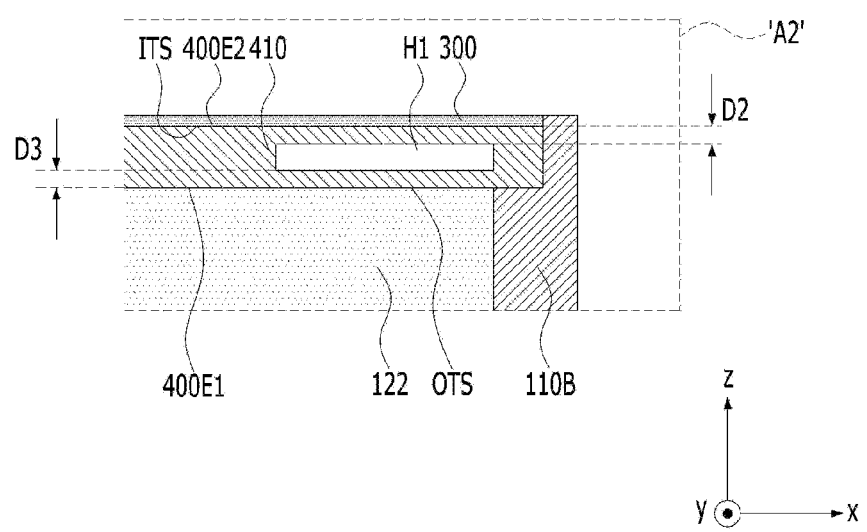
FIG. 5B is a cross-sectional view of portion 'A' shown in FIG. 4 according to an exemplary embodiment of the present invention.

FIG. 5A is a cross-sectional view of one exemplary embodiment A1 of portion 'A' shown in FIG. 4, and FIG. 5B is a cross-sectional view of another exemplary embodiment A2 of portion 'A' shown in FIG. 4. According to one exemplary embodiment, the groove in the insulating member 400 may be disposed to be spaced apart from the outer surface of the cell stack 122 and to be in contact with the inner surface of the enclosure 300. For example, referring to FIG. 5A, the groove H1 formed in the first insulating member 410 may be spaced apart from the outer top surface OTS of the cell stack 122 by a predetermined distance D1 and may be in contact with the inner top surface ITS of the enclosure 300.

According to another exemplary embodiment, an aperture or a groove H may be spaced apart both from the outer surface of the cell stack 122 and from the inner surface of the enclosure 300, and may be disposed between the first edge and the second edge of the insulating member 400, e.g. may be disposed at the center of the insulating member 400. Particularly, the portion of the insulating member 400 that is in contact with the outer surface (i.e. the outer top surface OTS) of the cell stack 122 corresponds to the first edge, and the portion of the insulating member 400 that is in contact with the inner surface (i.e. the inner top surface ITS) of the enclosure 300 corresponds to the second edge. For example, referring to FIG. 5B, the aperture or groove H1 formed in the first insulating member 410 may be spaced apart from the inner top surface ITS of the enclosure 300 by a predetermined distance D2, may be spaced apart from the outer top surface OTS of the cell stack 122 by a predetermined distance D3, and may be disposed at the center of the first insulating member 410.

When the groove H is formed to be in contact with the outer surface of the cell stack 122, it may be difficult to secure the rigidity of the cell module 122. However, according to the exemplary embodiment, as shown in FIG. 5A or 5B, the groove H may be spaced apart from the outer surface of the cell stack 122, whereas all of the bottom surfaces 410B, 420B, 430B, and 440B of the insulating member 400 may be disposed to be in contact with the outer surface of the cell stack 122, thus securing the rigidity of the cell module 122.

The groove H may include a plurality of grooves formed therein and spaced apart from each other in the first direction (e.g. the x-axis direction). For example, referring to FIG. 3A, the first insulating member 410 may include a plurality of grooves H1 formed therein and spaced apart from each other in the first direction (e.g. the x-axis direction), and the second insulating member 420 may include a plurality of grooves H2 formed therein and spaced apart from each other in the first direction (e.g. the x-axis direction).

Figure 6:
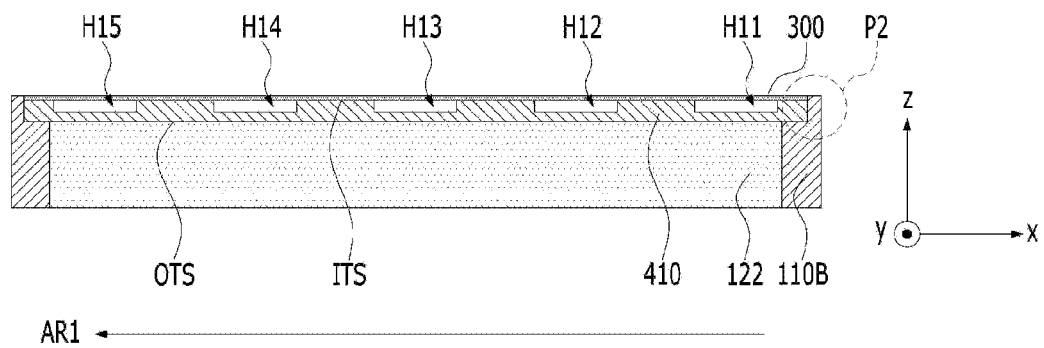
FIG. 6 shows a cross-sectional shape taken along line III-III' in FIG. 3B according to an exemplary embodiment of the present invention.
Figure 7:
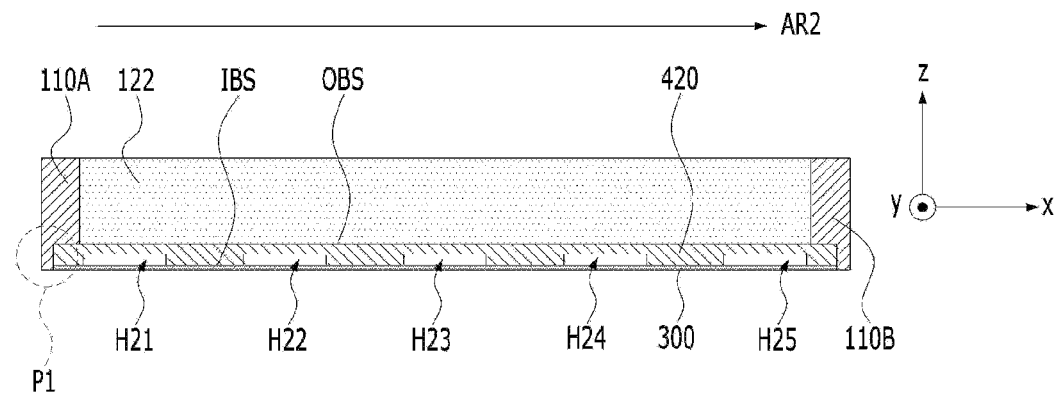
FIG. 7 shows a cross-sectional shape taken along line III-III' in FIG. 3B according to an exemplary embodiment of the present invention.

FIGS. 6 to 9 show various cross-sectional shapes according to the exemplary embodiment taken along line III-III' in FIG. 3B. The first to fourth insulating members 410 to 440, as described above, may include a plurality of grooves formed therein and arranged in the first direction (e.g. the x-axis direction). For example, as shown in FIG. 6, the first insulating member 410 may include a plurality of grooves H11, H12, H13, H14, and H15 formed therein and disposed in the first direction (e.g. the x-axis direction). As shown in FIG. 7, the second insulating member 420 may include a plurality of grooves H21, H22, H23, H24, and H25 formed therein and arranged in the first direction (e.g. the x-axis direction).

Figure 8:
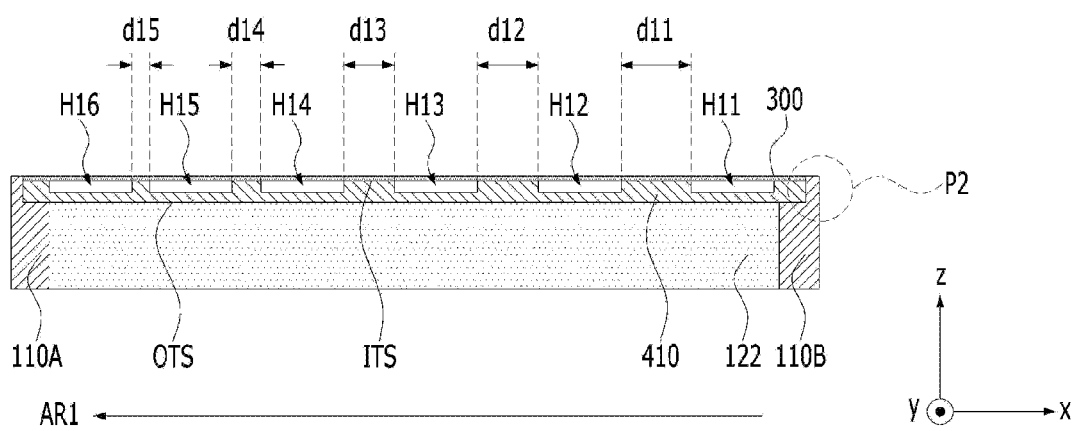
FIG. 8 shows a cross-sectional shape taken along line III-III' in FIG. 3B according to an exemplary embodiment of the present invention.
Figure 9:
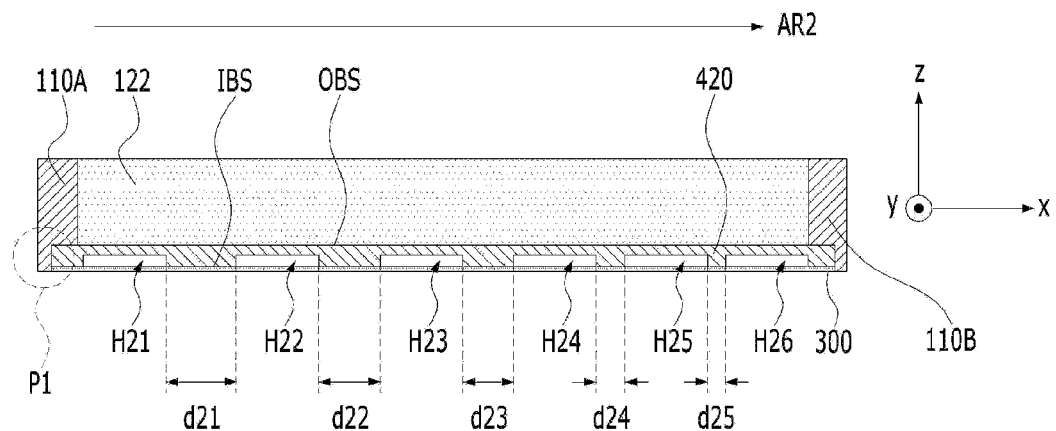
FIG. 9 shows a cross-sectional shape taken along line III-III' in FIG. 3B according to an exemplary embodiment of the present invention.

As shown in FIG. 8, the first insulating member 410 may include a plurality of grooves H11, H12, H13, H14, H15, and H16 formed therein and arranged in the first direction (e.g. the x-axis direction). As shown in FIG. 9, the second insulating member 420 may include a plurality of grooves H21, H22, H23, H24, H25, and H26 formed therein and arranged in the first direction (e.g. the x-axis direction).

As illustrated in FIGS. 6 and 7, each of the first and second insulating members 410 and 420 may include five grooves formed therein, and as illustrated in FIGS. 8 and 9, each of the first and second insulating members 410 and 420 may include six grooves formed therein. However, the exemplary embodiment is not limited as to the number of grooves that are formed in each insulating member 400 (410, 420, 430, and 440).

Further, as illustrated in FIGS. 3D and 6 to 9, the grooves may be formed to be in contact with the inner surface of the enclosure 300 as shown in FIG. 5A. However, the following description of the grooves may also be applied to the configuration in which a plurality of apertures or grooves shown in FIGS. 3D and 6 to 9 are formed in the center of the insulating member 400, as shown in FIG. 5B.

According to one exemplary embodiment, the apertures or grooves disposed in the first direction (e.g. the x-axis direction) may gradually increase in depth from the inlet or the outlet. The apertures or grooves may gradually increase in size as the distance increases from the second end plate 110B at which the outlet is disposed.

For example, as shown in FIG. 6, the groove H11, which is the closest to the second point P2 in the second corner of the upper side of the second end plate 110B, at which the outlet is disposed, may have a smallest size among the grooves H11 to H15 in the first insulating member 410. Additionally, the groove H15, which is the farthest from the second point P2 in the second corner of the upper side of the second end plate 110B, at which the outlet is disposed, may have a largest size among the grooves H11 to H15 in the first insulating member 410. In other words, as illustrated, the grooves H11 to H15 may gradually increase in size in the direction indicated by the arrow AR1. The sizes of the grooves in the first insulating member 410 may be expressed using Equation 1 below.

$$S11 < S12 < S13 < S14 < S15 \qquad \text{Equation 1}$$

wherein, S11, S12, S13, S14 and S15 respectively represent the sizes of the grooves H11, H12, H13, H14, and H15 formed in the first insulating member 410.

Further, the grooves may gradually increase in size from the first end plate 110A at which the inlet is disposed. For example, as shown in FIG. 7, the groove H21, which is the closest to the inlet disposed at the first point P1 in the first corner of the lower side of the first end plate 110A, may have a smallest size among the grooves H21 to H25 in the second insulating member 420. Additionally, the groove H25, which is the farthest from the inlet disposed at the first point P1 in the first corner of the lower side of the first end plate 110A, may have a largest size among the grooves H21 to H25 in the second insulating member 420. In other words, as illustrated, the grooves H21 to H25 may gradually increase in size in the direction indicated by the arrow AR2. The sizes of the grooves in the second insulating member 420 may be expressed using Equation 2 below.

$$S21<S22<S23<S24<S25 \qquad \text{Equation 2}$$

wherein, S21, S22, S23, S24, and S25 respectively represent the sizes of the grooves H21, H22, H23, H24, and H25 formed in the second insulating member 420.

As described above, when the grooves gradually increase in size from the inlet and the outlet, the amount of air flowing through the groove that is close to the inlet or the outlet may be equal to or similar to the amount of air flowing through the groove that is distant from the inlet or the outlet. In particular, the air passes through the grooves disposed closer to the inlet or the outlet at a higher flow rate.

Further, a plurality of grooves included in each insulating member 400 (410, 420, 430, and 440) may include a first groove and a second groove. In particular, the second groove may be defined as a groove that is located farther from the inlet and the outlet than the first groove. The second groove may have a larger cross-sectional area than the first groove.

For example, as shown in FIG. 3D, among the distances L1 and L2 of the first and second paths between the fifth point P5, at which the inlet is disposed, and the sixth point P6, at which the outlet is disposed, when the distance L2 of the second path is greater than the distance L1 of the first path, the sizes of the grooves formed in the second and fourth insulating members 420 and 440 located in the second path may be greater than the size of the grooves formed in the first and third insulating members 410 and 430 located in the first path. However, unlike the configuration shown in FIG. 3D, when the distance L1 of the first path is greater than the distance L2 of the second path, the sizes of the grooves formed in the first and third insulating members 410 and 430 located in the first path may be greater than the sizes of the grooves formed in the second and fourth insulating members 420 and 440 located in the second path.

As described above, when the cross-sectional area of the second groove, which is located farther from the inlet and the outlet than the first aperture or groove, is greater than the cross-sectional area of the first groove, the amount of air flowing through the first groove may be equal to or similar to the amount of air flowing through the second groove. In particular, the flow rate of the air passing through the first groove is greater than the flow rate of the air passing through the second groove.

According to still another exemplary embodiment, while a plurality of grooves have the same size as each other, the distances between the grooves may gradually decrease from the inlet and the outlet. For example, referring to FIG. 8, the grooves H11 to H16 formed in the first insulating member 410 have the same size as each other. However, the distances between the grooves may gradually decrease from the second point P2 in the upper side of the second end plate 110B at which the outlet is disposed. In other words, as illustrated, the distances between the grooves H11 to H16 may gradually decrease in the direction indicated by the arrow AR1. The distances between the grooves H11 to H16 in the first insulating member 410 may be expressed using Equation 3 below.

$$d15<d14<d13<d12<d11 \qquad \text{Equation 3}$$

wherein, d11 represents the distance between the grooves H11 and H12, d12 represents the distance between the grooves H12 and H13, d13 represents the distance between the grooves H13 and H14, d14 represents the distance between the grooves H14 and H15, and d15 represents the distance between the grooves H15 and H16.

Further, referring to FIG. 9, the grooves H21 to H26 formed in the second insulating member 420 may have the same size as each other. However, the distances between the grooves may gradually decrease from e.g. the first point P1 in the lower side of the first end plate 110A at which the inlet is disposed. In other words, as illustrated, the distances between the grooves H21 to H26 may gradually decrease in the direction indicated by the arrow AR2. The distances between the grooves H21 to H26 in the second insulating member 420 may be expressed using Equation 4 below.

$$d25<d24<d23<d22<d21 \qquad \text{Equation 4}$$

wherein, d21 represents the distance between the grooves H21 and H22, d22 represents the distance between the grooves H22 and H23, d23 represents the distance between the grooves H23 and H24, d24 represents the distance between the grooves H24 and H25, and d25 represents the distance between the grooves H25 and H26.

As described above, when the distances between the grooves gradually decrease from the inlet and the outlet, the amount of air flowing through a groove that is distant from the inlet or the outlet may be equal to or similar to the amount of air flowing through a groove that is close to the inlet or the outlet. In particular, although the grooves have the same size as each other, the air passes through the grooves disposed closer to the inlet or the outlet at a higher flow rate, and thus the amount of air flowing through the section in which the distance between the grooves is relatively short may be greater than the amount of air flowing through the section in which the distance between the grooves is relatively long during a predetermined time period.

In addition, the fuel cell according to the exemplary embodiment may further include a humidity sensor. The humidity sensor may be configured to sense the humidity in the space between the cell stack 122 and the enclosure 300. The humidity sensor may be disposed between the outlet and the inlet. For example, the humidity sensor may be disposed on at least one of the third corner P3 between the first inner side surface ISS1 and the inner top surface ITS of the enclosure 300 or the fourth corner P4 between the second inner side surface ISS2 and the inner bottom surface IBS of the enclosure 300.

Alternatively, the humidity sensor may be disposed adjacent to at least one of the third corner P3 or the fourth corner P4. For example, the humidity sensor may be disposed on the inner top surface ITS or the first inner side surface ISS1, adjacent to the third corner P3, or may be disposed on the inner bottom surface IBS or the second inner side surface ISS2, adjacent to the fourth corner P4.

Meanwhile, various exemplary embodiments for discharging the air, which is suctioned through the inlet of the enclosure 300, through the outlet will be described below with reference to the accompanying drawings. However, the exemplary embodiment is not limited thereto.

Figure 10:
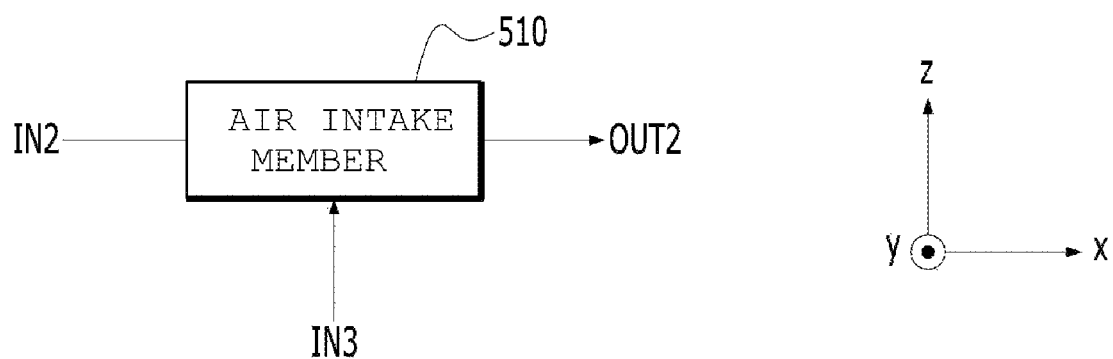
FIG. 10 is a block diagram of an air intake member that may be included in the fuel cell according to an exemplary embodiment of the present invention.

FIG. 10 is a block diagram of an air intake member 510 that may be included in the fuel cell 100. The fuel cell 100 shown in FIG. 1 may further include the air intake member 510 shown in FIG. 10.

Particularly, the air intake member 510 may be configured to suction air IN2 using an air compressor, and a negative pressure is formed in the air intake member 510 based on the flow rate of the air IN2 introduced into the air intake member 510. Since the air intake member 510 may be connected to the outlet of the enclosure 300, air OUT1 discharged from the outlet of the enclosure 300 may be suctioned into the air intake member 510 through an input terminal IN3 by the negative pressure in the air intake member 510, and may be discharged to the outside through an output terminal OUT2.

Accordingly, the negative pressure in the air intake member 510 may cause the air IN1, suctioned from the outside through the inlet of the enclosure 300, to circulate in the space between the outer surface of the cell stack 122 and the inner surface of the enclosure 300, to be discharged to the air intake member 510 through the outlet of the enclosure 300, and to be discharged to the outside through the output terminal OUT2 of the air intake member 510.

Figure 11:
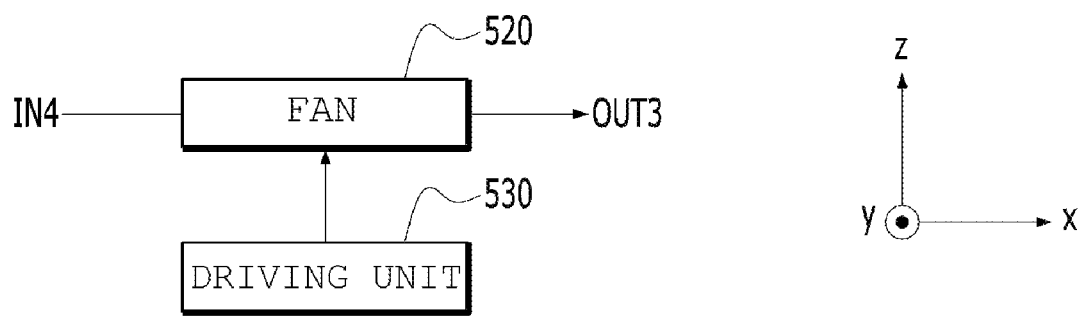
FIG. 11 is a block diagram of a fan and a driving unit that may be included in the fuel cell according to an exemplary embodiment of the present invention.

FIG. 11 is a block diagram of a fan 520 and a driving unit 530 that may be included in the fuel cell 100. The fuel cell 100 shown in FIG. 1 may further include the fan 520 and the driving unit 530 shown in FIG. 11. The fan 520 may be configured to discharge air introduced through an input terminal IN4 through an output terminal OUT3 in response to a driving signal supplied from the driving unit 530 (e.g., a controller), e.g. a driving voltage of about 15 volts.

When the input terminal IN4 of the fan 520 is connected to the outlet of the enclosure 300, the air OUT1 discharged from the outlet of the enclosure 300 may be suctioned into the input terminal IN4 of the fan 520, and may be discharged through the output terminal OUT3 of the fan 520. For example, the fan 520 may be directly connected to the outlet of the enclosure 300, or may be indirectly connected to the outlet of the enclosure 300 via a separate tube (e.g. a hose). The air IN1 suctioned from the outside of the enclosure 300 may circulate in the space between the outer surface of the cell stack 122 and the inner surface of the enclosure 300 due to the rotation of the fan 520, may be discharged to the fan 520 through the outlet, and may be discharged through the output terminal OUT3 of the fan 520.

The humidity may increase in the space between the outer surface of the cell stack 122 and the inner surface of the enclosure 300 due to moisture leaking to the outside during the operation of the cell stack 122. When moisture accumulates above the saturated water vapor pressure level in this space, condensation occurs inside the cell stack 122. However, since the air discharged from the outlet may be suctioned by the air intake member 510 or the fan 520, the air may circulate in the space between the outer surface of the cell stack 122 and the inner surface of the enclosure 300, thereby appropriately managing the humidity in this space.

The fuel cell according to the exemplary embodiment may include the insulating member 400 disposed to prevent deformation of the cell stack 122 having a single-module structure and to secure the rigidity thereof. The aperture or groove formed in the insulating member 400 to ventilate the space between the cell stack 122 and the enclosure 300 prevents condensation of water in the cell stack 122. Thus, the fuel cell according to the exemplary embodiment prevents deterioration in electrical insulation due to an electrical path, which may be created between high-power parts and the chassis by the condensate water, thereby securing high-power electrical insulation (or stability) in the cell stack 122 and preventing corrosion of the internal parts of the cell stack 122.

As is apparent from the above description, a fuel cell according to the exemplary embodiment enables smooth circulation of air in the space between the outer surface of a cell stack and the inner surface of an enclosure, thereby preventing deterioration in electrical insulation due to the creation of an electrical path between high-power parts and the chassis. As a result, it may be possible to secure high-power electrical insulation (or stability) in the cell stack and to prevent corrosion of the internal parts of the cell stack.

The above-described various exemplary embodiments may be combined with each other without departing from the object of the present invention unless being contrary to each other. In addition, for any element, which is not described in detail, of any of the various exemplary embodiments, refer to the description of the element having the same reference numeral of another exemplary embodiment.

While the present invention has been particularly shown and described with reference to exemplary embodiments thereof, these exemplary embodiments are only proposed for illustrative purposes and do not restrict the present invention, and it will be apparent to those skilled in the art that various changes in form and detail may be made without departing from the essential characteristics of the exemplary embodiments set forth herein. For example, respective configurations set forth in the exemplary embodiments may be modified and applied. Further, differences in such modifications and applications should be construed as falling within the scope of the present invention as defined by the appended claims.

What is claimed is:

1. A fuel cell, comprising:
   a cell stack having a plurality of unit cells stacked in a first direction;
   a first end plate and a second end plate disposed at respective ends of the cell stack;
   an enclosure disposed to surround at least a part of the cell stack, wherein the enclosure includes an inlet that suctions external air and an outlet that discharges air that has been suctioned through the inlet and has circulated in a space between the cell stack and the enclosure; and
   an insulating member disposed to extend in the first direction in a space between an outer surface of the cell stack and an inner surface of the enclosure, wherein the insulating member is located outside the cell stack, divides the space into a plurality of spaces, and includes a groove formed in the insulating member to provide communication between the divided plurality of spaces;
   wherein one of opposite ends of the insulating member is disposed to be partially inserted into the first end plate and the other of the opposite ends of the insulating member is disposed to be partially inserted into the second end plate.

2. The fuel cell according to claim 1, wherein the groove is spaced apart from the outer surface of the cell stack and is in contact with the inner surface of the enclosure.

3. The fuel cell according to claim 1, wherein the insulating member includes:
   a first edge that is in contact with the outer surface of the cell stack; and
   a second edge that is in contact with the inner surface of the enclosure,
   wherein the groove is spaced apart from the outer surface of the cell stack and the inner surface of the enclosure and is disposed between the first edge and the second edge of the insulating member.

4. The fuel cell according to claim 1, wherein the groove includes a plurality of grooves disposed to be spaced apart from each other in the first direction at predetermined intervals.

5. The fuel cell according to claim 4, wherein the plurality of grooves disposed in the first direction gradually increase in depth from the inlet and the outlet.

6. The fuel cell according to claim 4, wherein the plurality of grooves include:
a first groove; and
a second groove located farther from the inlet and the outlet than the first groove,
wherein the second groove has a larger cross-sectional area than the first groove.

7. The fuel cell according to claim 4, wherein each groove of the plurality of grooves has a same depth, and distances between the plurality of grooves gradually decreases from the inlet and the outlet.

8. The fuel cell according to claim 1, wherein the inner surface of the enclosure includes:
a front surface and a rear surface facing each other in the first direction;
an inner top surface and an inner bottom surface facing each other in a second direction that intersects the first direction; and
a first inner side surface and a second inner side surface facing each other in a third direction that intersects the first direction and the second direction.

9. The fuel cell according to claim 8,
wherein the front surface of the enclosure corresponds to an inner surface of the first end plate, and
wherein the rear surface of the enclosure corresponds to an inner surface of the second end plate.

10. The fuel cell according to claim 8, wherein the inlet is disposed at the front surface in a first corner between the first inner side surface and the inner bottom surface of the enclosure, and wherein the outlet is disposed at the rear surface in a second corner between the second inner side surface and the inner top surface of the enclosure.

11. The fuel cell according to claim 8, wherein the inlet is disposed at the front surface adjacent to a first corner between the first inner side surface and the inner bottom surface of the enclosure, and wherein the outlet is disposed at the rear surface adjacent to a second corner between the second inner side surface and the inner top surface of the enclosure.

12. The fuel cell according to claim 8, further comprising:
a humidity sensor disposed on at least one of a third corner between the first inner side surface and the inner top surface of the enclosure or a fourth corner between the second inner side surface and the inner bottom surface of the enclosure.

13. The fuel cell according to claim 8, further comprising:
a humidity sensor disposed adjacent to at least one of a third corner between the first inner side surface and the inner top surface of the enclosure or a fourth corner between the second inner side surface and the inner bottom surface of the enclosure.

14. The fuel cell according to claim 8, wherein the outer surface of the cell stack includes:
an outer top surface and an outer bottom surface facing the inner top surface and the inner bottom surface of the enclosure, respectively; and
a first outer side surface and a second outer side surface facing the first inner side surface and the second inner side surface of the enclosure, respectively.

15. The fuel cell according to claim 14, wherein the insulating member includes:
a first insulating member disposed between the outer top surface of the cell stack and the inner top surface of the enclosure, the first insulating member having therein the groove;
a second insulating member disposed between the outer bottom surface of the cell stack and the inner bottom surface of the enclosure, the second insulating member having therein the groove;
a third insulating member disposed between the first outer side surface of the cell stack and the first inner side surface of the enclosure, the third insulating member having therein the groove; and
a fourth insulating member disposed between the second outer side surface of the cell stack and the second inner side surface of the enclosure, the fourth insulating member having therein the groove.

16. The fuel cell according to claim 1, further comprising an air intake member configured to suction the air discharged from the outlet.

17. The fuel cell according to claim 1, further comprising a fan configured to discharge the air through the outlet.

18. A fuel cell, comprising:
a cell stack having a plurality of unit cells stacked in a first direction;
a first end plate and a second end plate disposed at respective ends of the cell stack;
an enclosure disposed to surround at least a part of the cell stack and including an inlet that suctions external air and an outlet that discharges air that has been suctioned through the inlet and has circulated in a space between an outer surface of the cell stack and an inner surface of the enclosure; and
an insulating member disposed to extend in the first direction between the outer surface of the cell stack and the inner surface of the enclosure, wherein the insulating member is located outside the cell stack, and includes an aperture formed in the insulating member to allow the air to flow in a direction that intersects a direction in which the outer surface of the cell stack and the inner surface of the enclosure face each other and intersects the first direction;
wherein one of opposite ends of the insulating member is disposed to be partially inserted into the first end plate and the other of the opposite ends of the insulating member is disposed to be partially inserted into the second end plate.

19. The fuel cell according to claim 18, wherein the insulating member includes a plurality of apertures formed therein that vary in size.

* * * * *